(12) United States Patent
Qiu

(10) Patent No.: US 8,126,883 B2
(45) Date of Patent: Feb. 28, 2012

(54) METHOD AND SYSTEM FOR RE-RANKING SEARCH RESULTS

(76) Inventor: Gang Qiu, Cupertino, CA (US)

( * ) Notice: Subject to any disclaimer, the term of this patent is extended or adjusted under 35 U.S.C. 154(b) by 249 days.

(21) Appl. No.: 12/434,898

(22) Filed: May 4, 2009

(65) Prior Publication Data

US 2009/0276421 A1 Nov. 5, 2009

(30) Foreign Application Priority Data

May 4, 2008 (CN) .......................... 2008 1 0105725

(51) Int. Cl.
*G06F 17/30* (2006.01)

(52) U.S. Cl. ....................................................... 707/723

(58) Field of Classification Search .............. 707/3, 723; 709/223; 706/46
See application file for complete search history.

(56) References Cited

U.S. PATENT DOCUMENTS

RE41,899 E * 10/2010 Rose et al. ...................... 706/46
2002/0194166 A1* 12/2002 Fowler .............................. 707/3

* cited by examiner

*Primary Examiner* — Etienne Leroux

(57) ABSTRACT

A method for re-ranking search results, includes: generating the search results from a data source based on a search query from a user; retriving a re-ranking expression; re-ranking all or part of the documents in the search results based on the re-ranking expression; and displaying all or part of the documents in the search results with the re-ranked order.

21 Claims, 15 Drawing Sheets

| Label | Titles |
|---|---|
| B1 | A Course on Integral Equations |
| B2 | Attractors for Semigroups and Evolution Equations |
| B3 | Automatic Differentiation of Algorithms: Theory, Implementation, and Application |
| B4 | Geometrical Aspects of Partial Differential Equations |
| B5 | Ideals, Varieties, and Algorithms – An Introduction to Computational Algebraic Geometry and Commutative Algebra |
| B6 | Introduction to Hamiltonian Dynamical Systems and the N-Body Problem |
| B7 | Knapsack Problems: Algorithms and Computer Implementations |
| B8 | Methods of Solving Singular Systems of Ordinary Differential Equations |
| B9 | Nonlinear Systems |
| B10 | Ordinary Differential Equations |
| B11 | Oscillation Theory for Neutral Differential Equations with Delay |
| B12 | Oscillation Theory of Delay Differential Equations |
| B13 | Pseudodifferential Operators and Nonlinear Partial Differential Equations |
| B14 | Sinc Methods for Quadrature and Differential Equations |
| B15 | Stability of Stochastic Differential Equations with Respect to Semi-Martingales |
| B16 | The Boundary Integral Approach to Static and Dynamic Contact Problems |
| B17 | The Double Mellin-Barnes Type Integrals and Their Applications to Convolution Theory |

| Label | Titles |
|---|---|
| B1 | A Course on Integral Equations |
| B2 | Attractors for Semigroups and Evolution Equations |
| B3 | Automatic Differentiation of Algorithms: Theory, Implementation, and Application |
| B4 | Geometrical Aspects of Partial Differential Equations |
| B5 | Ideals, Varieties, and Algorithms – An Introduction to Computational Algebraic Geometry and Commutative Algebra |
| B6 | Introduction to Hamiltonian Dynamical Systems and the $N$-Body Problem |
| B7 | Knapsack Problems: Algorithms and Computer Implementations |
| B8 | Methods of Solving Singular Systems of Ordinary Differential Equations |
| B9 | Nonlinear Systems |
| B10 | Ordinary Differential Equations |
| B11 | Oscillation Theory for Neutral Differential Equations with Delay |
| B12 | Oscillation Theory of Delay Differential Equations |
| B13 | Pseudodifferential Operators and Nonlinear Partial Differential Equations |
| B14 | Sinc Methods for Quadrature and Differential Equations |
| B15 | Stability of Stochastic Differential Equations with Respect to Semi-Martingales |
| B16 | The Boundary Integral Approach to Static and Dynamic Contact Problems |
| B17 | The Double Mellin-Barnes Type Integrals and Their Applications to Convolution Theory |

FIG. 1

| Terms | Documents | | | | | | | | | | | | | | | | |
|---|---|---|---|---|---|---|---|---|---|---|---|---|---|---|---|---|---|
| | B1 | B2 | B3 | B4 | B5 | B6 | B7 | B8 | B9 | B10 | B11 | B12 | B13 | B14 | B15 | B16 | B17 |
| algorithms | 0 | 0 | 1 | 0 | 1 | 0 | 1 | 0 | 0 | 0 | 0 | 0 | 0 | 0 | 0 | 0 | 0 |
| application | 0 | 0 | 1 | 0 | 0 | 0 | 0 | 0 | 0 | 0 | 1 | 0 | 0 | 0 | 0 | 0 | 1 |
| delay | 0 | 0 | 0 | 0 | 0 | 0 | 0 | 1 | 0 | 1 | 1 | 1 | 1 | 1 | 1 | 0 | 0 |
| differential | 0 | 0 | 0 | 1 | 0 | 0 | 0 | 1 | 0 | 1 | 1 | 1 | 1 | 1 | 1 | 0 | 0 |
| equations | 1 | 1 | 0 | 1 | 0 | 0 | 0 | 1 | 0 | 1 | 1 | 1 | 1 | 1 | 0 | 0 | 0 |
| implementation | 0 | 0 | 1 | 0 | 0 | 0 | 1 | 0 | 0 | 0 | 0 | 0 | 0 | 0 | 0 | 1 | 1 |
| integral | 1 | 0 | 0 | 0 | 1 | 0 | 0 | 0 | 0 | 0 | 0 | 0 | 0 | 0 | 0 | 0 | 0 |
| introduction | 0 | 0 | 0 | 0 | 0 | 1 | 0 | 0 | 0 | 0 | 0 | 0 | 0 | 1 | 0 | 1 | 1 |
| methods | 0 | 0 | 0 | 0 | 0 | 0 | 0 | 1 | 0 | 0 | 0 | 0 | 0 | 1 | 0 | 0 | 0 |
| nonlinear | 0 | 0 | 0 | 0 | 0 | 0 | 0 | 0 | 1 | 0 | 0 | 0 | 1 | 0 | 0 | 0 | 0 |
| ordinary | 0 | 0 | 0 | 0 | 0 | 0 | 0 | 1 | 0 | 0 | 0 | 0 | 0 | 0 | 0 | 0 | 0 |
| oscillation | 0 | 0 | 0 | 0 | 0 | 0 | 0 | 0 | 0 | 0 | 0 | 0 | 1 | 0 | 0 | 0 | 0 |
| partial | 0 | 0 | 0 | 1 | 0 | 1 | 1 | 0 | 0 | 0 | 1 | 1 | 1 | 0 | 0 | 0 | 0 |
| problem | 0 | 0 | 0 | 0 | 0 | 1 | 0 | 0 | 0 | 0 | 0 | 0 | 0 | 0 | 0 | 1 | 0 |
| systems | 0 | 0 | 0 | 0 | 0 | 0 | 0 | 0 | 0 | 0 | 0 | 0 | 0 | 0 | 0 | 0 | 0 |
| theory | 0 | 0 | 1 | 0 | 0 | 0 | 0 | 0 | 0 | 0 | 0 | 1 | 0 | 0 | 0 | 0 | 1 |

FIG. 2

$$\begin{pmatrix} 0.0159 & -0.4317 \\ 0.0266 & -0.3756 \\ 0.1785 & -0.1692 \\ 0.6014 & 0.1187 \\ 0.6691 & 0.1209 \\ 0.0148 & -0.3603 \\ 0.0520 & -0.2248 \\ 0.0066 & -0.1120 \\ 0.1503 & 0.1127 \\ 0.0813 & 0.0672 \\ 0.1503 & 0.1127 \\ 0.1785 & -0.1692 \\ 0.1415 & 0.0974 \\ 0.0105 & -0.2363 \\ 0.0952 & 0.0399 \\ 0.2051 & -0.5448 \end{pmatrix}$$

FIG. 4

$$
\begin{pmatrix} 0.0511 & -0.3337 \end{pmatrix} = \begin{pmatrix} 0 \\ 1 \\ 0 \\ 0 \\ 0 \\ 0 \\ 0 \\ 0 \\ 0 \\ 0 \\ 0 \\ 0 \\ 0 \\ 0 \\ 0 \\ 1 \end{pmatrix}^T \begin{pmatrix} 0.0159 & -0.4317 \\ 0.0266 & -0.3756 \\ 0.1785 & -0.1692 \\ 0.6014 & 0.1187 \\ 0.6691 & 0.1209 \\ 0.0148 & -0.3603 \\ 0.0520 & -0.2248 \\ 0.0066 & -0.1120 \\ 0.1503 & 0.1127 \\ 0.0813 & 0.0672 \\ 0.1503 & 0.1127 \\ 0.1785 & -0.1692 \\ 0.1415 & 0.0974 \\ 0.0105 & -0.2363 \\ 0.0952 & 0.0399 \\ 0.2051 & -0.5448 \end{pmatrix} \begin{pmatrix} 4.5314 & 0 \\ 0 & 2.7582 \end{pmatrix}^{-1}
$$

FIG. 6

41 calculating the vector of the re-ranking content based on the term vector table

42 calculating the re-ranking relevance score between each vector in all or part of the document vectors in the search results and the vector of the re-ranking content

43 re-ranking all or part of the search result based on the re-ranking relevance score

| Query the search results based on re-ranking content |
|---|

52

| calculate the statistics frequency in the documents matched with the re-ranking content and reorder the documents by the statistics frequency; the documents that do not matched with the re-ranking content will be put after the matched documents according to the sequence in the step 31 in FIG. 9 |
|---|

Query the search results based on re-ranking content

62 re-ordered the matched documents ahead according to the orders created in the step 31 in FIG. 9; the unmatched documents will be put after the matched documents according to the orders in the step 31 in FIG. 9.

METHOD AND SYSTEM FOR RE-RANKING SEARCH RESULTS

TECHNICAL FIELD

The present invention relates to a computer search system, specifically to re-ranking a search result.

BACKGROUND OF THE INVENTION

With the recent explosion of information, the amount of information on the internet has expanded, with the scale of regular data bases and file systems reaching intractable sizes. The challenge of finding useful information for users is that, if a search query is cast too narrow, some useful information may be missed and overlooked, and while on the other hand, if the search query expression is cast too wide, some useful information would be buried deep inside the search results among more useless information. For example, a user needs to search for the information on the Intelligent Network (IN). He is also particularly interested in applying the IN technology to the CDMA system, while learning about the IN technology in general. If the search query is set as "Intelligent network AND CDMA" as the current art doing, the results would be limited to a narrower set than expected, but if the query is "Intelligent network", then the results are too varied and more pertinent information related to CDMA technology would get lost among the more general results.

In the current manifestation of the internet search technologies, like Google, for example rankings of the search results are based on the perceived "importance of web pages" through the analysis of hyper-linked relationships among those pages. With this technology, the ranking rules are pre-defined by the system and user-specified interests have no impact on the ranking of the results. In other words, the user's searching demand is not being customized.

Therefore, a mechanism is needed to re-rank the search results based on the user's interest and render the most relevant part of the results at the top while maintaining the number of the search results without reducing it. With this novel mechanism, the user is able to find the information he expects most, while keeping the other information available. Also, by applying a different set of re-ranking expressions to the same set of search results, the user can get multiple re-sorted views that are re-ranked based on his different interests. In this way, the user's searching experience has been enhanced by using his personal interests as a customization factor.

BRIEF SUMMARY OF THE INVENTION

It is an object of the present invention to provide a re-ranking method that comprises of: searching the data source according to the search query, and ranking the search results based on the ranking order determined by the search query; retriving a user's interest as the re-ranking expression; re-ranking all or part of the documents in the search results based on the re-ranking expression; and displaying all or part of the documents in the search results with the re-ranked order.

It is another object of the present invention to provide a re-ranking system that comprises of: a search unit for generating the search results from a data source based on a search query from a user; a retrival unit for retriving a re-ranking expression; a re-ranking unit for re-ranking all or part of the search results based on the re-ranking expression; and a display unit for displaying all or part of the search result with the re-ranked order.

It is yet another object of the present invention to provide a computer storage medium encoded with a computer program, in which the computer program comprises instructions that when executed cause the computer to perform operations that comprise of: generating the search results from a data source based on a search query from a user; retriving a re-ranking expression; re-ranking all or part of the documents in the search result based on the re-ranking expression; and displaying all or part of the documents in the search result with the re-ranked order.

DESCRIPTION OF THE FIGURES

The above and other objectives, features and advantages of the present invention will be more apparent through the more detailed description with reference to the accompanying drawings of the present invention.

FIG. 1 illustrates terms representation and combination.

FIG. 2 illustrates a term-document matrix.

FIG. 4 illustrates a term vector table.

FIG. 6 illustrates how to composite a query vector based on a term vector table.

FIGS. 10-12 are detailed exemplary embodiments for the step 32 in FIG. 9.

FIG. 13 illustrates an example of displaying search result in the prior art.

FIGS. 14-15 illustrate specific application examples of re-ranking by a semantic relevance method according to the present invention.

In the accompanying drawings, the same reference number generally stands for the same unit, feature, or structure.

DETAILED DESCRIPTION OF THE PREFERRED EMBODIMENT

The content defined in the specification, such as the particular structure and unit, is used to help thoroughly understand the preferable embodiments of the present invention. Therefore, various changes and modifications can be made to the embodiments described in the invention according to the common techniques in the art without departing from the scope and spirit of the present invention. Therefore, for clarity and simplicity, the description of known functions and structures in the art is omitted.

Those skilled in the art could utilize a large number of semantic search technologies in the art to easily construct term vectors and document vectors. Among them, the modeling method of the latent semantic indexing (LSI) is the most representative. In the following, the principle of the latent semantic indexing will be introduced, which does not exclude other methods of semantic search to be used with the present invention.

A particular example will be described herein to explain the LSI more easily. Assuming that the documents consist of titles of 17 books.

In FIG. 1, the underlined words represent terms. Of course, for those skilled in the art, there are many other rules for selecting terms including increasing or reducing the number of the terms, and changing the manner of combination of the terms, etc.

FIG. 2 is a 16×17 term-document matrix, which is referred to as A. Rows represent the terms, and columns represent the documents. The elements of the matrix are the number of occurences of each term in a particular document.

By way of singular value decomposition, the term-document matrix A is decomposed into a product form of three matrices, that is, $$A = U\Sigma V^T \quad (1)$$

Wherein, $\Sigma$ is the diagonal matrix of the singular values.

Figure 3:
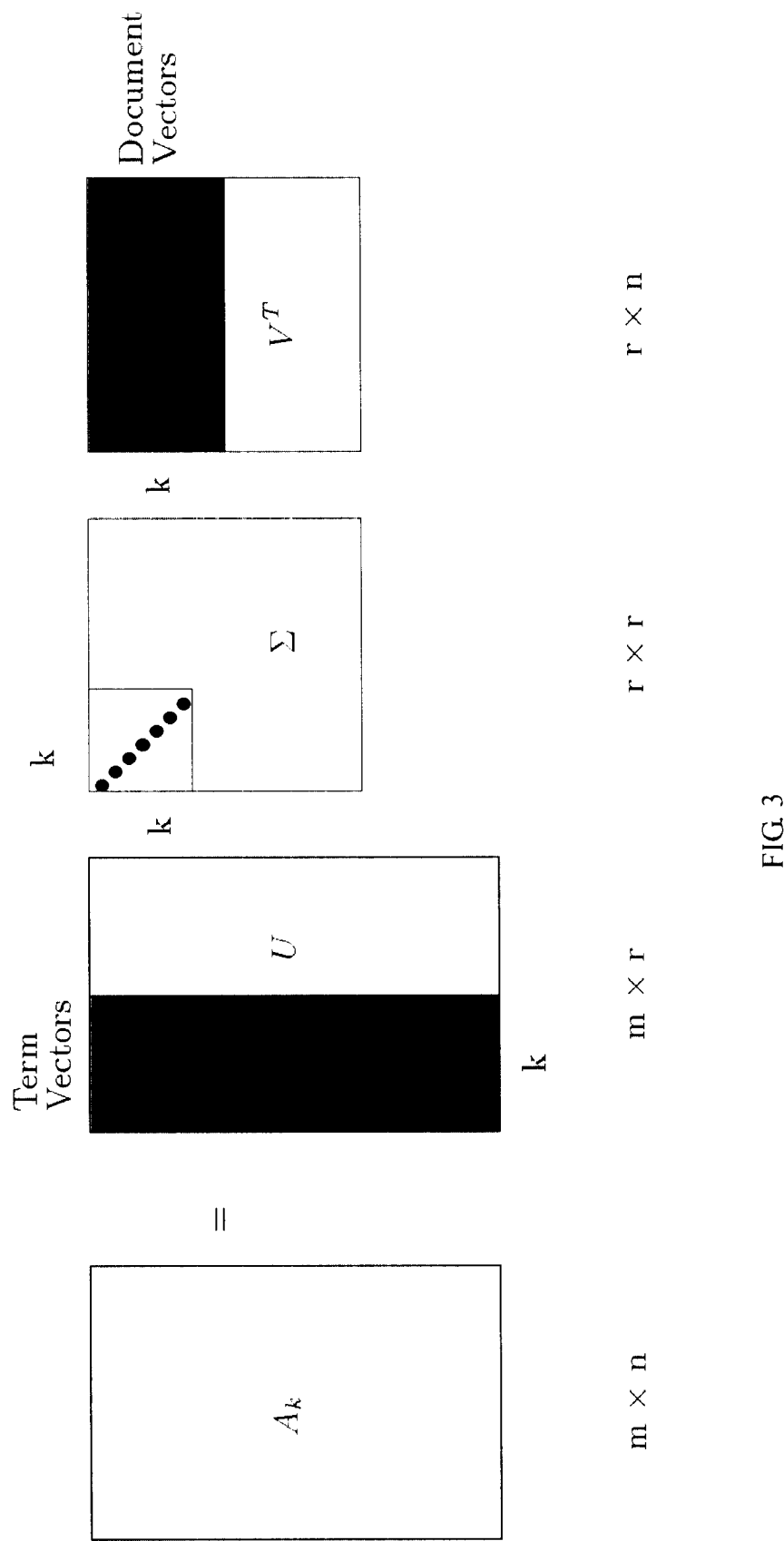
FIG. 3 illustrates the formula of reducing a high dimensional (r dimension) term space to a low dimensional (k dimension) term space.

FIG. 3 is a dimension reduction operation of LSI method. A higher-dimension (r-dimension) term space is reduced to a lower-dimension (k-dimension) term space.

For illustration purpose, the value of k is selected as 2, which means that the original term space is reduced to a two-dimensional term space. The first two columns of matrix U representing the terms in two-dimensional space as the term vector table, is shown as FIG. 4.

With basic term vectors, new vector can be composited according to $$v = q^T U_k \sum_k^{-1} \quad (2)$$

For example, document vector $B_i$ and the query request entered by users can both be composited by analyzing the terms cited. It should be appreciated by those skilled in the art that the weight of a term vector may also be considered in compositing the vector.

Figure 5:
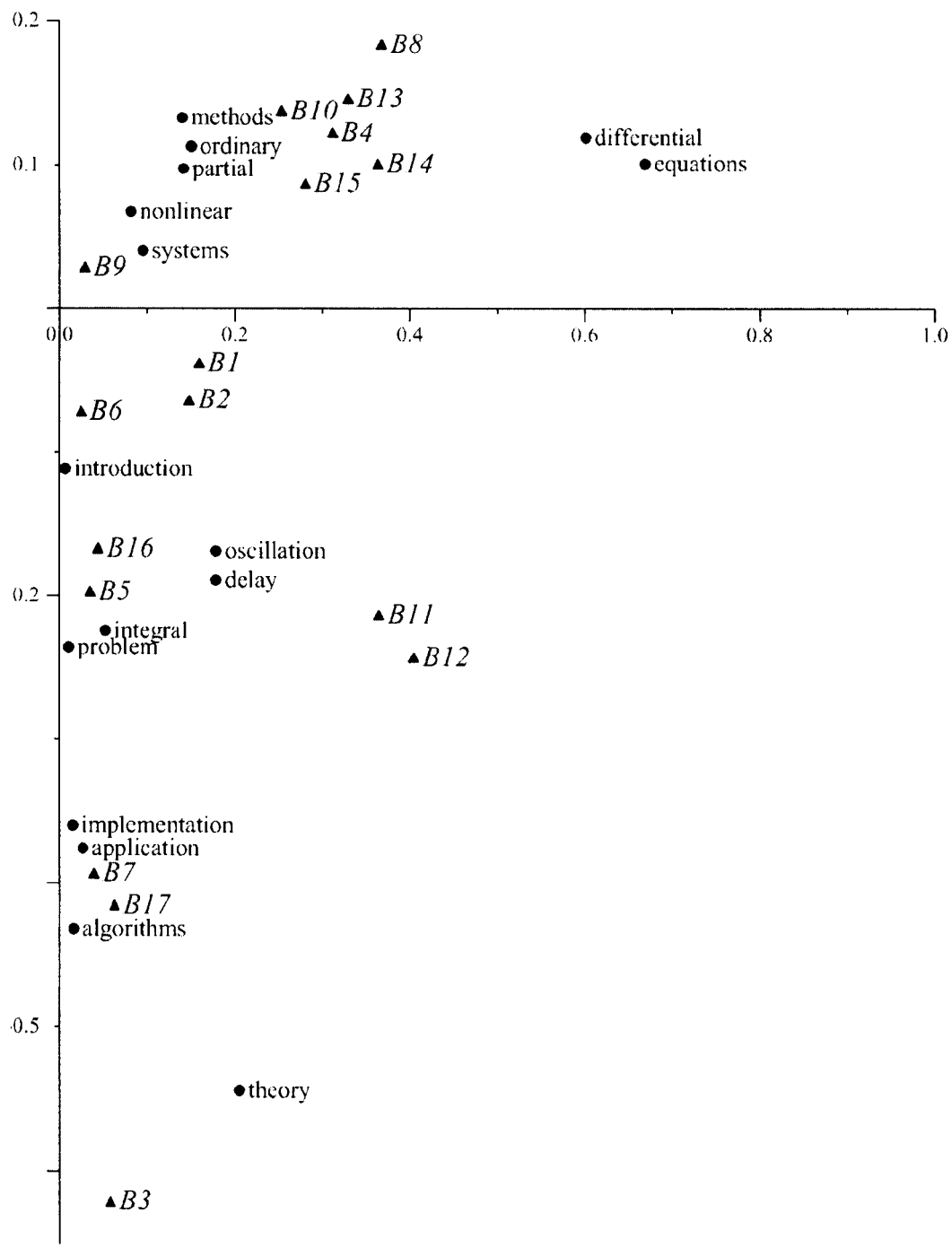
FIG. 5 illustrates the projection relationship between terms and documents in a reduced space of two dimension.

FIG. 5 plots the relationship of terms and documents in the two-dimensional space. The smaller the angle between term vectors or conversely, the larger the cosine value of the angle is, the larger the relevance score between two terms is. Taking the term "oscillation" as an example, its angle with "delay" is the smallest in all terms, which makes "delay" the most relevant one with "oscillation".

When a user enters a query expression, for example "application theory", the system, by way of analyzing the two terms "application" and "theory" in the expression, composites two term vectors according to equation 2, as shown in FIG. 6, thereby obtaining a vector for the query expression.

The cosine of the angle between each document vector and the query expression vector is computed, and the greater the cosine is the more relevant the document and the query expression are.

The relevance score of a term and a document is represented by the cosine value of the angle between document vector and the query expression vector. For example, the cosine of the angle between the term "nonlinear" and the document vector of B9 is the greatest, so the document most relevant to "nonlinear" is B9.

In conjunction with the above principle, an term vector table can be obtained by performing the foregoing process with a sufficient number of available documents. The method to compute the document vector comprises of: extracting the terms in the document; finding the term vectors from the term vector table, and compositing these vectors into a document vector as shown in equation 2. The present invention is described based on the term vector table.

RELEVANT REFERENCES ARE AS FOLLOWS

1. M. W. Berry. S. T. Dumaiis & G. W. O'Brien. Using Linear Algebra Intelligent Information Retrieval. Computer Science Department CS-94-270 1994-12
2. Ju Bin. The Research and Implementation of Latent Semantic Index in Chinese Language Information Search. Computer Engineering 2007-03
3. Chen Yue, Guo Li. Latent Semantic Search and its Application. Information Search Techniques. Column 6, 2001.
4. Michael W. Berry Paul G. Young. Using latent semantic indexing for multilanguage information retrieval. Volume 29, Number 6/1995-12

Figure 7:
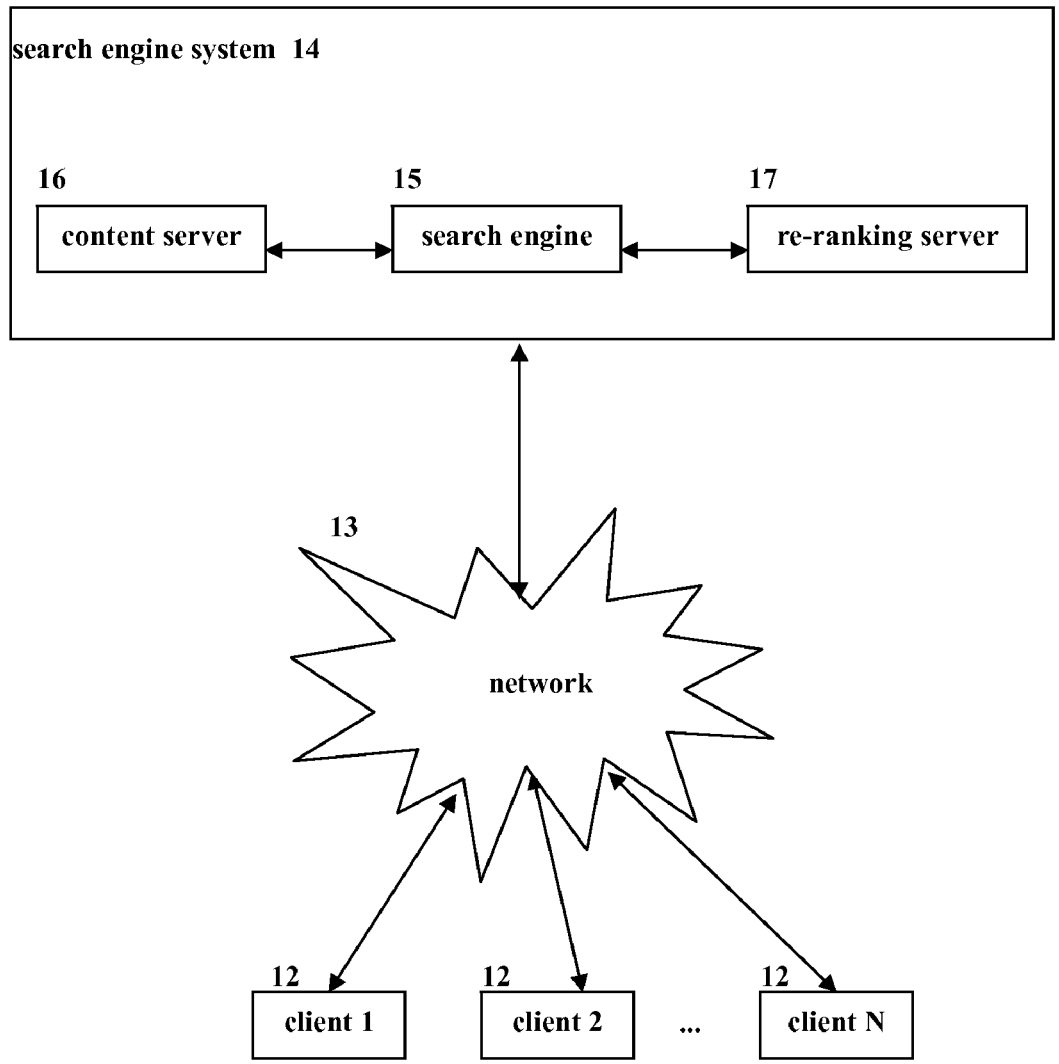
FIG. 7 illustrates a network system 10 implementing the present invention.

FIG. 7 shows a network system 10 on which the present invention can be realized. At least one client 12 is connected with the search engine system 14 via network 13, using the Internet. The search engine system 14 comprises at least one search engine 15. The search engine is used for processing the search query from client 12, and then generating a search result according to the search query, and finally returning the search result to the client. The search engine system 14 further includes at least one content server 16 and one re-ranking server 17. The content server 16 is used for storing a large number of indexed documents from different websites. Alternatively, or additionally, the content server 16 stores the index of documents stored in other websites. The search engine 15 communicates with at least one content server 16 and selects multiple documents in response to a particular search query.

The re-ranking server 17 re-ranks all or part of the above selected documents by using the re-ranking expression and sends the re-ranked results to the requested client, wherein the re-ranking expression can be a user input that comes with the search query or can be defined in advance, or can be automatically set equal to the search query by the system without any user input.

Figure 8:
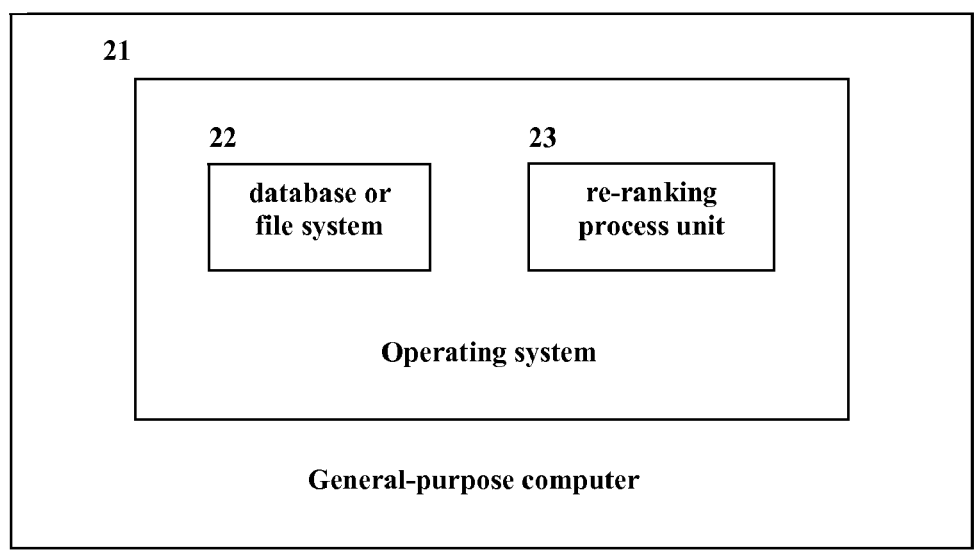
FIG. 8 illustrates a common computer system 20 implementing the present invention.

FIG. 8 show a general-purpose computer 20 on which the present invention can be realized. The general-purpose computer runs an operating system 21 on which a database or file system 22 runs and a re-ranking process unit 23. The operating system 21 is used to receive a search query from an input unit (not shown) of the general-purpose computer 20 and sends the search query to the database or file system 22. The database or file system 22 can be any current in-use databases such as DB2, ACCESS, MSSQL, MYSQL, ORACLE, VF, etc. The database or file system 22 can be any proper file system, e.g. FAT32 or NTFS. The database or file system 22 implements a corresponding search operation after receiving a search query from a user, and then sends the search results to a re-ranking process unit 23.

The re-ranking process unit 23 will process the search result according to a re-ranking expression received, wherein the re-ranking expression can be a user input that comes with a search query, or can be defined in advance, or can be automatically set equal to the search query by the system without any user input. Thereafter, a re-ranking operation is excuted to calculate the relevance score between the search results and the re-ranking expression. Finally, a display unit (not shown) shows the search result in order of calculated relevance score.

Figure 9:
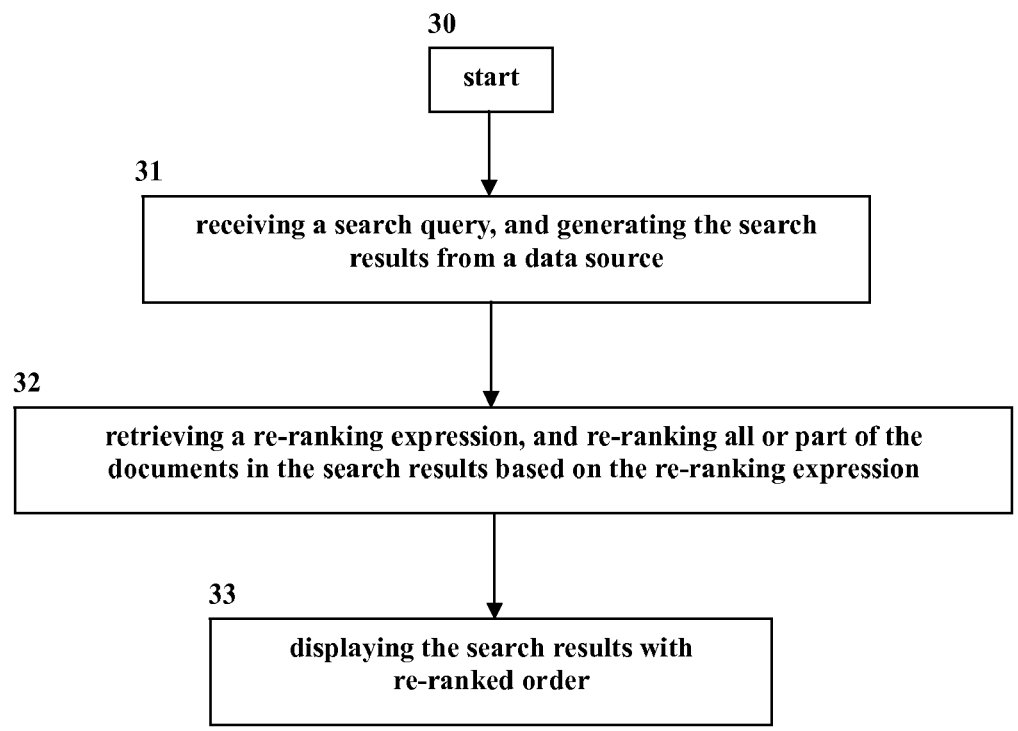
FIG. 9 illustrates a flow chart implementing a search process in accordance with one exemplary embodiment of the present invention.

FIG. 9 shows a flow chart of a re-ranked search results in accordance with one exemplary embodiment of the present invention. The process is started at step 30. At step 31, a search unit (e.g. the search engine 15 in FIG. 7 or database/file system 22 in FIG. 2) receives a search query submitted by a user, and the search unit can optionally create a query strategy according to the search query (for example, standardizing the query to a proper style for the user's further process, and/or modifying the query based on a predefined principle to expand or reduce the search scope). At step 31, the search unit implements a search operation based on the query (or query strategy if it has been built), and obtains a series of documents matched with the query, and then sends the search result to a re-ranking unit (e.g. the re-ranking server in FIG. 7 or the re-ranking process unit in FIG. 8). If the user input is a search query that is a boolean search query, the search results will be all or part of the documents matched with the search condition; If the user input is a search query that is a semantic search, the search result will be the N most relevant documents. It is well known that the relevancy depends on the cosine value of the angle between the search query vector and the vector of the searched documents.

At step 32, a re-ranking unit (e.g. the re-ranking server in FIG. 7 or the re-ranking process unit in FIG. 8) receives a re-ranking expression, wherein the re-ranking expression can be a real-time or predefined user input. The re-ranking expression represents a user interest, that is, what documents the user most expects to view. According to the re-ranking expression, all or part of the documents in the search results will be processed and re-ordered. At step 33, the result will be shown in the re-ranked order while displaying all the results from step 31. The search result can be shown with the initial rank order if it is required. A re-ranking expression comprises two parts: one part is a re-ranking type indicator to indicate the type for ranking, including a semantic relevancy type, statistics frequency type, or boolean type; the second part is a re-ranking content which is the expression for re-ranking.

FIG. 10 shows a detailed exemplary embodiment for the step 32 in FIG. 9, which illustrates a re-ranking example using semantic relevancy. Starting from step 41, it calculates the vector of the re-ranking content based on the term vector table, wherein the re-ranking content can be a word, phrase, sentence, paragraph, article, or multiple articles. At step 42, it calculates a re-ranking relevance score between each vector in all or part of the document vectors in the search results and the vector of the re-ranking conten. At step 43, it re-ranks all or part of the documents in search results according to the re-ranking relevance score. The larger the score value is, the more relevant the re-ranking content is to the document, that is, the document is what the user most expects to view or access.

FIG. 11 shows another detailed exemplary embodiment for the step 32 in FIG. 9, which illustrates a re-ranking example using statistics frequency. Starting at step 51, the search results of the step 31 in FIG. 9 is re-ranked and the re-ranking content in re-ranking expression is a boolean query expression used to implement a re-ranking operation. At step 52, the statistics frequency for all or part of the documents in the search results matched with the re-ranking content is calculated and the documents are re-ordered by the statistics frequency. The documents that do not match the re-ranking content will be output after the matched documents according to the original sequence which was obtained in the step 31 in FIG. 9.

FIG. 12 shows another detailed exemplary embodiment for the step 32 in FIG. 9, which illustrates a re-ranking example using a boolean expression. Starting at step 61, the search results from the step 31 in FIG. 9 is re-ranked and the re-ranking content in re-ranking expression is a boolean query expression used to implement a re-ranking operation. At step 62, the boolean search for all or part of the documents in the search results is performed and the documents that are matched with the boolen expression are re-ordered to top while maintaining the same orders which were created in the step 31 in FIG. 9; the unmatched documents will be output after the matched documents according to the orders which were created in the step 31 in FIG. 9.

Figure 13:
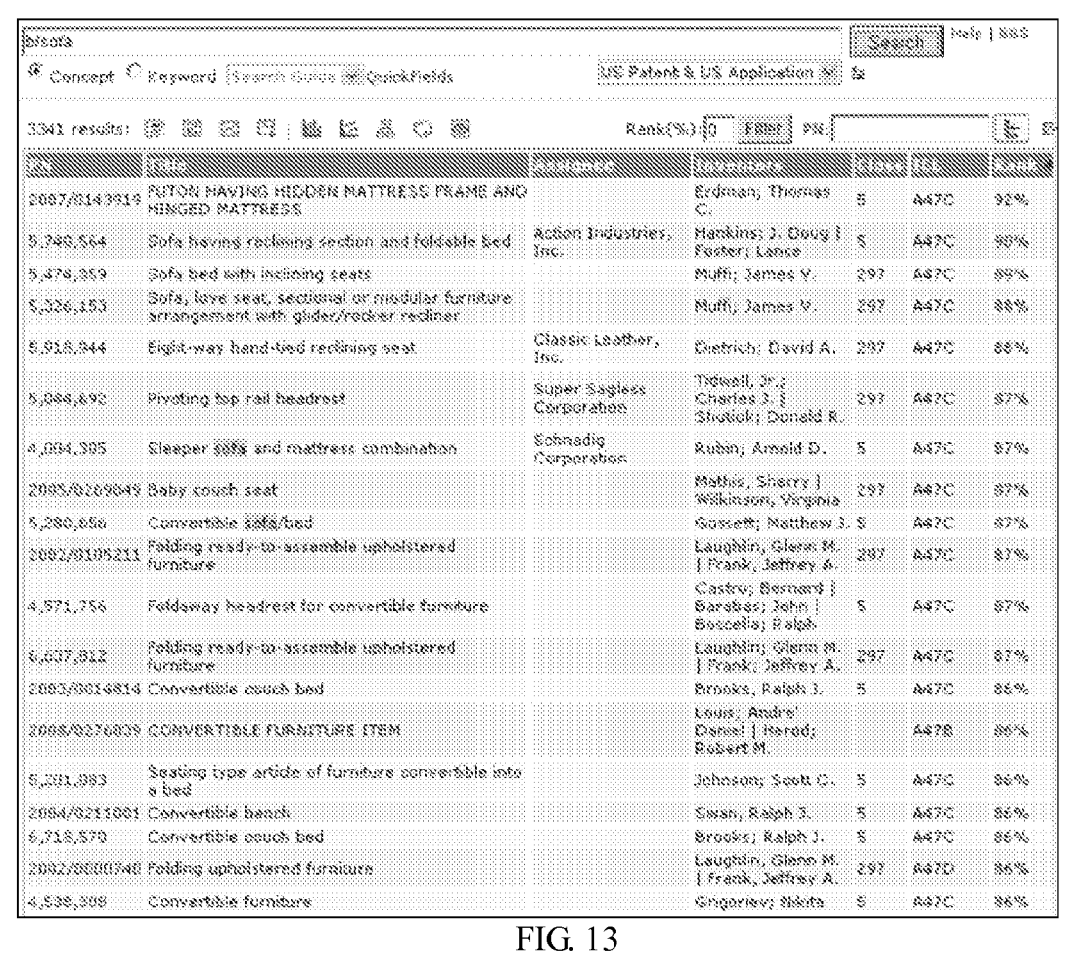

FIG. 13 illustrates an example of displaying a search result in the prior art. In www.patentics.com/search.htm, a user intends to search the documents which contains 'sofa', and a boolean search is adopted. The 3341 matched results obtained are displayed to the user without re-ranking. Apparently, the search result is shown only because the word 'sofa' appears in the documents, which will result in the fact that most results on the first page are not relevant.

Figure 14:
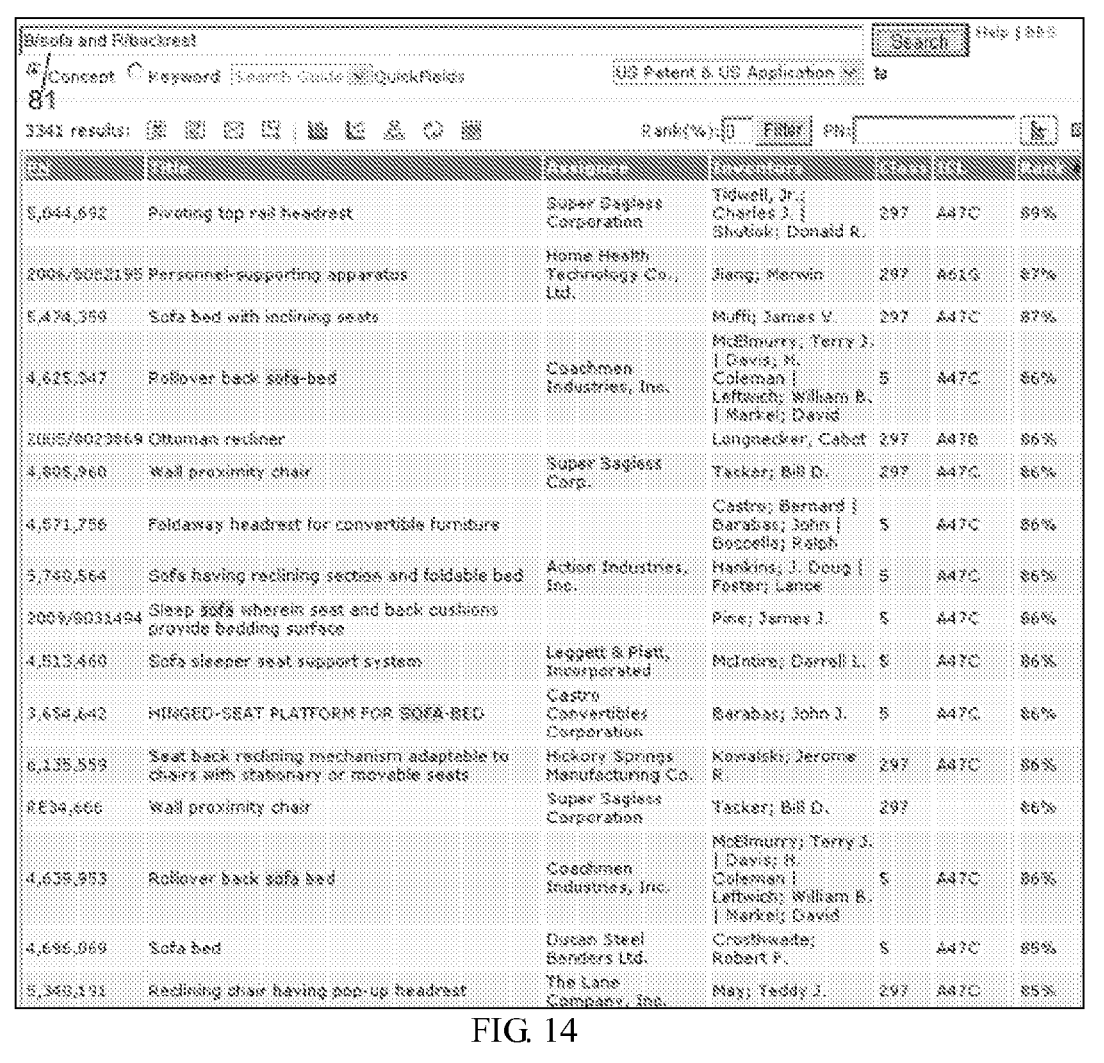

FIG. 14 shows a specific application example according to the present invention. In www.patentics.com/search.htm, a user wants to search for the documents which contains the word 'sofa', and the user also wants to access the documents related to the term 'backrest' first. For this purpose, the user types 'B/sofa and R/backrest' into the input box 81, wherein 'B/' stands for a boolean search but it is not limited to this representation, and 'R/' stands for re-ranking the search results by the term 'backrest' but it is not limited to this representation. The search results in FIG. 14 is all the documents including 'sofa'. There are totally 3341 results in the search result (exactly the same as in FIG. 13); furthermore, the results are re-ranked with the term 'backrest'. For example, the 10 results on the first page (but not limited this amount) are re-ranked by the re-ranking score between the document vector and the 'backrest' vector, and displayed in order according to the re-ranking score. Comparing the display order in FIG. 13 to the display order in FIG. 14, there are obviously difference—all the documents are related to 'sofa' and most relevant to 'backrest', wherein rank 89% represents the relevance score of the document and the re-ranking expression, that is the cosine value of the angle between the document vector and the re-ranking vector is 0.89.

Figure 15:
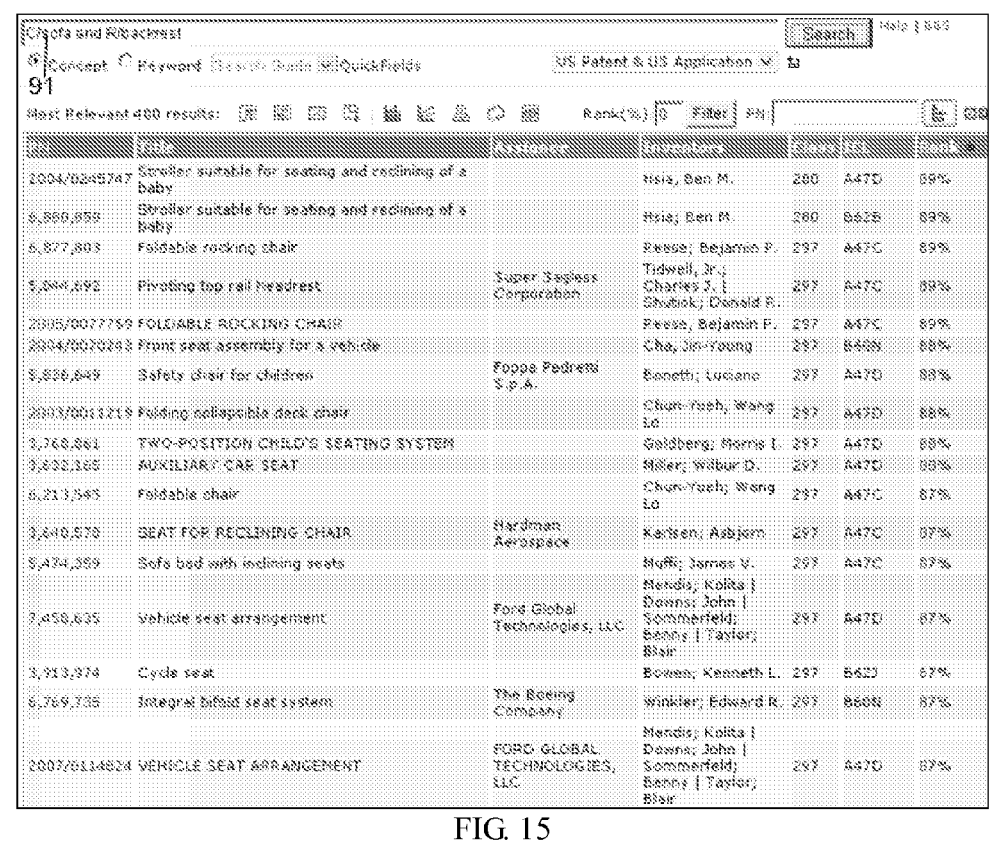

FIG. 15 shows another specific application example according to the present invention. In www.patentics.com/search.htm a user wants to search for the documents containing the term 'sofa', and the user also wants to access the documents related to the term 'backrest'. For this purpose, the user types 'C/sofa and R/backrest' into the input box 91, wherein 'C/' stands for a semantics search (but it is not limited to this representation), and 'R/' stands for re-ranking the search result with the term 'backrest' (but it is not limited to this representation). The search results in FIG. 15 is the documents that are most relevant to the term 'sofa', which means the cosine values (relevancy) of each document's vector in the search results and the vector of term 'sofa' is the largest ones. The number 400 (but not limited to this amount) is predefined by the system. And then all or part of the 400 results, for example, the 10 results on the first page (but not limited to this amount) are re-ranked by calculating the relevance score of the document vector and the vector of the term 'backrest', and displayed in the order of relevance score, wherein rank 89% represents the relevance score of the document and the re-ranking expression, that is the cosine value of the angle between the document vector and the re-ranking vector is 0.89.

Although the exemplary embodiments of the present invention have been described with reference to the accompanying drawings, it should be understood that the present invention is not limited to these exact exemplary embodiments and that one skilled in the art, without departing from the scope and spirit of the present invention, can make various modifications and changes to the exemplary embodiments.

All these modifications and changes are intended to be contained within the scope as defined by the Claims of the present invention.

I claim:

1. A method for re-ranking search results, comprising the steps of:
   Step 1: receiving a search query;
   Step 2: generating the search results based on the search query from a data source;
   Step 3: retrieving a re-ranking expression, wherein the re-ranking expression is a text string that comes with the search query and does not perform any operation in generating the search results from the data sources; and
   Step 4: re-ranking all or part of the documents in the search results based on the re-ranking expression; and
   Step 5: displaying all or part of the documents in the search results with the re-ranked order.

2. The method of claim 1, wherein the data source is at least one of a plurality of sources including, the internet, at least one of a plurality of data bases, or at least one of a plurality types of file systems.

3. The method of claim 1, wherein the re-ranking expression is predefined or input in real-time by the user.

4. The method of claim 1, wherein the re-ranking expression includes a re-ranking type and a re-ranking content.

5. The method of claim 4, wherein the re-ranking type is a boolean re-ranking type and wherein the re-ranking content is a boolean expression.

6. The method of claim 4, wherein the re-ranking type is a semantic re-ranking type and wherein the re-ranking content is a word, a phrase, a sentence, a paragraph, an article, or multiple articles.

7. The method of claim 6, wherein the step 3 further comprising the sub-steps of:
   (a) calculating a vector of the re-ranking content based on a term vector table;
   (b) calculating a re-ranking relevance score between each vector in all or part of the document vectors in the search results and the vector of the re-ranking content; and,
   (c) re-ranking all or part of the search result based on the re-ranking relevance score.

8. The method of claim 7, wherein the re-ranking relevance score is the cosine value between each vector in all or part of the document vector in the search results and the vector of the re-ranking content.

9. The method of claim 1, wherein the search query is based on a boolean search expression.

10. The method of claim 1, wherein the search query is based on a semantic search expression.

11. A system for re-ranking search results, comprising:
    a search unit for receiving a search query;
    a generating unit for generating the search results based on the search query from a data source;
    a re-ranking unit for retrieving a re-ranking expression, wherein the re-ranking expression is a text string that comes with the search query and does not perform any operation in generating the search results from the data sources, and
    a re-ranking calculation unit for re-ranking all or part of the search results based on the re-ranking expression; and
    a display unit for displaying all or part of the search result with the re-ranked order.

12. The system of claim 11, wherein the data source is at least one of a plurality of sources including, the internet, at least one of a plurality of data bases, or at least one of a plurality types of file systems.

13. The system of claim 11, wherein the re-ranking expression is predefined or input in real-time by the user.

14. The system of claim 11, wherein the re-ranking expression includes a re-ranking type and a re-ranking content.

15. The system of claim 14, wherein the re-ranking type is a boolean re-ranking type and wherein the re-ranking content is a boolean expression.

16. The system of claim 14, wherein the re-ranking type is a semantic re-ranking type and wherein the re-ranking content is a word, a phrase, a sentence, a paragraph, an article, or multiple articles.

17. The system of claim 16 wherein the re-ranking unit further comprising:
    (a) a vector calculation sub-unit for calculating a vector of the re-ranking content based on a term vector table;
    (b) a scoring sub-unit for calculating a re-ranking relevance score between each vector in all or part of the document vectors in the search results and the vector of the re-ranking content; and,
    (c) a re-ranking sub-unit for re-ranking all or part of the search result based on the re-ranking relevance score.

18. The system of claim 17, wherein the re-ranking relevance score is the cosine value between the document vector and the vector of the re-ranking content.

19. The system of claim 11, wherein the search query is based on a boolean search.

20. The system of claim 11, wherein the search query is based on a semantic search.

21. A computer storage medium encoded with a computer program, the computer program comprising instructions that when executed cause a computer to perform operations comprising: receiving a search query and generating the search results based on the search query from a data source; retrieving a re-ranking expression wherein the re-ranking expression is a text string that comes with the search query and does not perform any operation in generating the search results from the data sources, and re-ranking all or part of the documents in the search results based on the re-ranking expression; and displaying all or part of the documents in the search results with the re-ranked order.

* * * * *